United States Patent
Crowne (10) Patent No.: US 10,641,673 B2
(45) Date of Patent: May 5, 2020

(54) OPTICALLY POWERED REMOTELY INTERROGATED LIQUID GAUGING SYSTEM

(71) Applicant: Simmonds Precision Products, Inc., Vergennes, VT (US)

(72) Inventor: David H. Crowne, Weybridge, VT (US)

(73) Assignee: Simmonds Precision Products, Inc., Vergennes, VT (US)

(*) Notice: Subject to any disclaimer, the term of this patent is extended or adjusted under 35 U.S.C. 154(b) by 361 days.

(21) Appl. No.: 15/694,122

(22) Filed: Sep. 1, 2017

(65) Prior Publication Data

US 2019/0072446 A1   Mar. 7, 2019

(51) Int. Cl.
| | |
|---|---|
| *B64C 3/34* | (2006.01) |
| *B64D 37/02* | (2006.01) |
| *H02J 50/80* | (2016.01) |
| *H02J 50/30* | (2016.01) |
| *G01L 9/00* | (2006.01) |
| *G01L 19/14* | (2006.01) |
| *G01L 19/08* | (2006.01) |
| *G01K 1/02* | (2006.01) |

(52) U.S. Cl.
CPC ............. *G01L 9/0076* (2013.01); *B64C 3/34* (2013.01); *B64D 37/02* (2013.01); *G01K 1/024* (2013.01); *G01L 19/086* (2013.01); *G01L 19/141* (2013.01); *H02J 50/30* (2016.02); *H02J 50/80* (2016.02)

(58) Field of Classification Search
None
See application file for complete search history.

(56) References Cited

U.S. PATENT DOCUMENTS

| | | |
|---|---|---|
| 5,119,679 A | 6/1992 | Frisch |
| 5,172,112 A | 12/1992 | Jennings |
| 5,207,099 A | 5/1993 | Baker |
| 5,814,830 A | 9/1998 | Crowne |
| 6,434,494 B1 | 8/2002 | Forsythe, Jr. et al. |
| 6,606,905 B2 | 8/2003 | Carroll et al. |
| 6,670,601 B1 | 12/2003 | Wyler |

(Continued)

OTHER PUBLICATIONS

Partial European Search Report for EP Application No. 18190421.0, dated Jan. 24, 2019, pp. 12.

(Continued)

*Primary Examiner* — Natalie Huls
*Assistant Examiner* — Jermaine L Jenkins
(74) *Attorney, Agent, or Firm* — Kinney & Lange, P.A.

(57) ABSTRACT

An optically powered pressure sensor for sensing pressure of a liquid in a tank includes a hermetically sealed housing with at least a portion of the housing having a diaphragm, at least one sensor within the hermetically sealed housing, at least one optical emitter, and a photocell array. The hermetically sealed housing forms at least a portion of a hermetically sealed wall of the tank. The at least one sensor within the hermetically sealed housing is configured to sense the pressure of the liquid. The at least one optical emitter is configured to transmit data corresponding to the sensed pressure. The photocell array is configured to receive light and provide power to the at least one sensor and the at least one optical emitter.

19 Claims, 5 Drawing Sheets

(56) References Cited

U.S. PATENT DOCUMENTS

| | | |
|---|---|---|
| 7,240,560 B2 | 7/2007 | Silverbrook et al. |
| 10,337,893 B2 * | 7/2019 | Benward ............ G06K 19/0727 |
| 2006/0170543 A1 * | 8/2006 | A. Schaffer .......... G01F 23/284 |
| | | 340/521 |
| 2007/0028684 A1 * | 2/2007 | Benz .................... G01F 23/284 |
| | | 73/314 |
| 2014/0175876 A1 | 6/2014 | Cheatham, III et al. |
| 2015/0100253 A1 | 4/2015 | Austerlitz et al. |
| 2017/0021914 A1 | 1/2017 | Small et al. |
| 2017/0176235 A1 | 6/2017 | Crowne |

OTHER PUBLICATIONS

Extended European Search Report for EP Application No. 18190421.0, dated May 8, 2019, pp. 11.

* cited by examiner

OPTICALLY POWERED REMOTELY INTERROGATED LIQUID GAUGING SYSTEM

BACKGROUND

In many fuel and flammable liquid measurement applications it is important to know the quantity of liquid in a storage tank. Herein, quantity refers to volume and mass. In aircraft, the confirmation of fuel quantity is used after refueling to support flight planning. Typically, this is performed with a secondary system composed of magnetic float level indicators. Magnetic float level indicators are manually operated sensors. A float containing a magnet is allowed to move vertically along a sealed cylinder and sits at the plane of the fuel level. A calibrated staff residing with the cylinder contains a magnet at its tip. The staff can be unlocked and lowered until the two magnets couple. An operator can measure the fuel level from the scale on the staff and a fixed reference, such as the bottom of the aircraft wing. The operator must obtain a lift to read the scale on the staff. The operator can then determine fuel volume using the fuel level, aircraft attitude, and a height to volume lookup table. The operator can then take a fuel density sample to convert volume to mass.

SUMMARY

In one example, an optically powered pressure sensor for sensing pressure of a liquid in a tank comprises a hermetically sealed housing with at least a portion of the housing having a diaphragm, at least one sensor within the hermetically sealed housing, at least one optical emitter, and a photocell array. The hermetically sealed housing forms at least a portion of a hermetically sealed wall of the tank. The at least one sensor within the hermetically sealed housing is configured to sense the pressure of the liquid. The at least one optical emitter is configured to transmit data corresponding to the sensed pressure. The photocell array is configured to receive light and provide power to the at least one sensor and the at least one optical emitter.

In one example, a system comprises an optically powered pressure sensor and an optical interrogator. The optically powered pressure sensor senses a pressure of a liquid in a tank. The optically powered pressure sensor comprises a hermetically sealed housing with at least a portion of the housing having a diaphragm, at least one sensor within the hermetically sealed housing, at least one optical emitter, and a photocell array. The hermetically sealed housing forms at least a portion of a hermetically sealed wall of the tank. The at least one sensor is configured to sense the pressure of the liquid. The at least one optical emitter is configured to transmit data corresponding to the sensed pressure of the liquid. The photocell array is configured to receive light and provide power to the at least one sensor and the at least one optical emitter. The optical interrogator is configured to provide high power light to the photocell array and receive data from the at least one optical emitter.

In one example, a method comprises receiving light from an optical interrogator via a photocell array; generating, in response to receiving the light, power from the received light using the photocell array; sensing, in response to generating the power, a pressure of a liquid using at least one sensor, the at least one sensor powered by the photocell array; and transmitting, in response to measuring the pressure, data corresponding to the pressure of the liquid using at least one optical emitter.

DETAILED DESCRIPTION

Apparatus, systems, and associated methods relate to determining a liquid quantity of a tank using an optical interrogator and an optically powered pressure sensor. In some applications, such as an aircraft, fuel quantities of a fuel tank are determined. Manually checking and calculating the fuel quantity of an aircraft fuel tank is cumbersome, time consuming, and prone to error. Using the apparatus, systems, and associated methods herein, allows for the fuel quantity to be determined quickly, without the operator leaving the ground and without obtaining a fuel sample.

Figure 1:
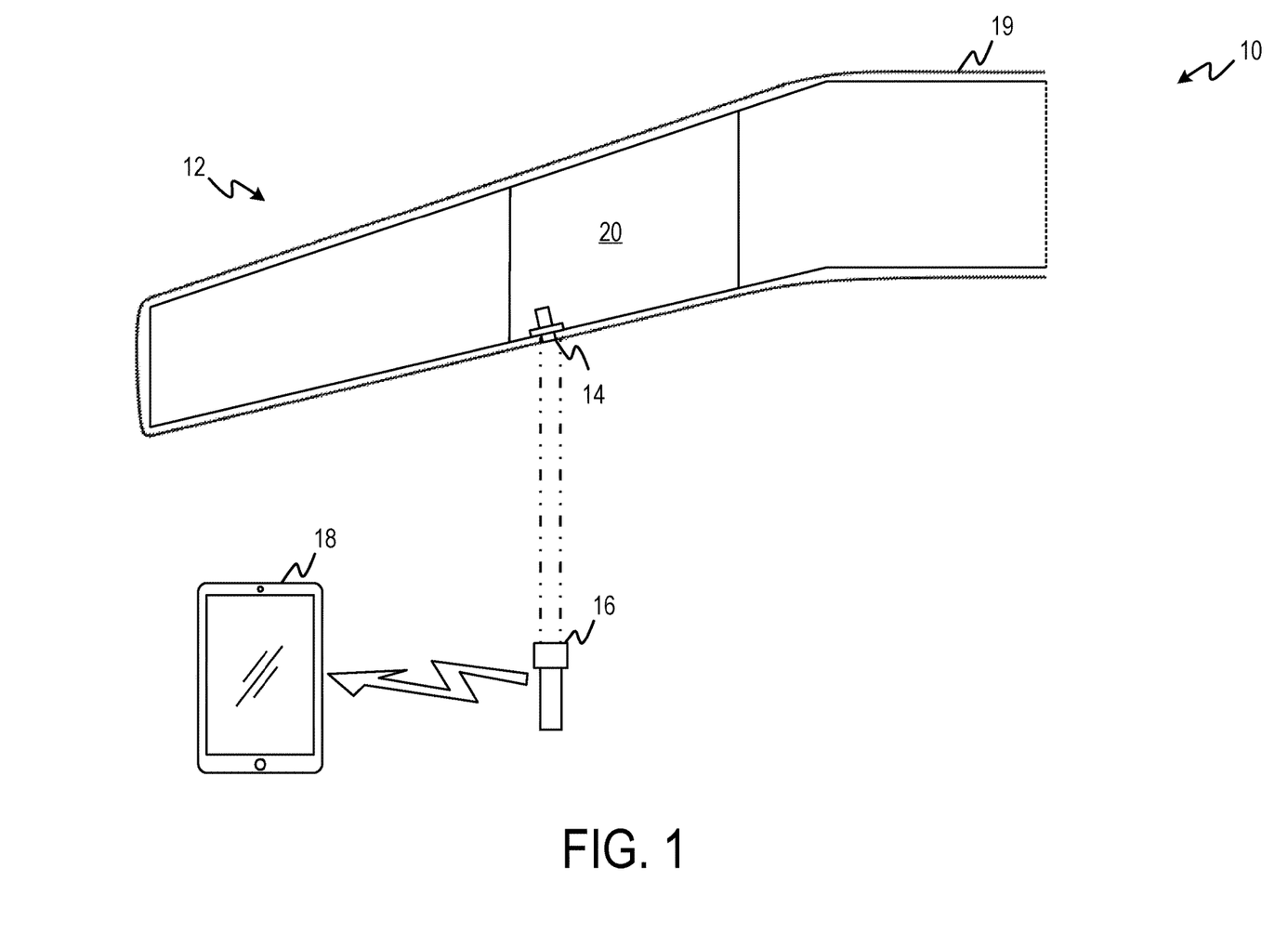
FIG. 1 illustrates an optically powered remotely interrogated liquid gauging system being used on a fuel tank of an aircraft.

FIG. 1 illustrates optically powered remotely interrogated liquid gauging system 10 including aircraft wing 12, optically powered pressure sensor 14, optical interrogator 16, and computing device 18. Aircraft wing 12 includes wing skin 19 and fuel tank 20.

Optically powered pressure sensor 14 is installed in fuel tank 20. Optically powered pressure sensor 14 is installed such that the bottom end containing a photocell array is flush with wing skin 19 and the photocell array is optically exposed. The housing of optically powered pressure sensor 14 is hermetically sealed. In one example, the hermetically sealed housing is made of stainless steel. At least a portion of the hermetically sealed housing is a diaphragm exposed to the fuel of fuel tank 20. The hermetically sealed housing is conductively coupled to wing skin 19. In one example, optically powered pressure sensor 14 is screwed into a threaded mount of wing skin 19, thereby conductively coupling and mechanically coupling them. Conductively coupling the hermetically sealed housing to wing skin 19 puts the hermetically sealed housing at equipotential with the wing skin, which protects the fuel of fuel tank 20 from electromagnetic interference and lightning strikes.

Optical interrogator 16 is shown shining a beam of light on the bottom end of optically powered pressure sensor 14. The bottom end of optically powered pressure sensor 14 is optically exposed, allowing the beam of light to reach the photocell array. This can be done while a user of optical interrogator 16 remains on the ground. The photocell array generates power using the beam of light, thereby providing power to the various components of optically powered pressure sensor 14. Optically powered pressure sensor 14 includes at least one pressure sensor, at least one temperature sensor, at least one processor, and at least one optical emitter in addition to the photocell array. The at least one pressure sensor is configured to sense a pressure of the fuel of fuel tank 20. The at least one temperature sensor is configured to sense a temperature of the fuel of fuel tank 20.

Also shown in FIG. 1 is an optical beam emitted by the at least one optical emitter of optically powered pressure sensor 14. Optical interrogator 16 includes at least one optical receiver to receive data from optical pressure sensor 14 via the optical beam emitted by the optical emitter of optically powered pressure sensor 14. Data received from optically powered pressure sensor 14 includes data corresponding to the pressure and temperature sensed by optically powered pressure sensor 14. Optical interrogator 16 includes at least one temperature sensor configured to sense an ambient temperature. Optical interrogator 16 is configured to determine a fuel quantity of fuel tank 20 using the sensed pressure and temperature of the fuel, the sensed ambient temperature, and the geometry of fuel tank 20.

Computing device 18 is shown communicatively coupled to optical interrogator 16. Computing device 18 is configured to receive data corresponding to the fuel quantity determined by optical interrogator 16. Computing device 18, for example, can be a tablet, a fuel operations computer, a flight planning computer, the aircraft cockpit's electronic flight bag, etc. Optical interrogator 16 is configured to be able to communicate with any computing device using cellular or other wireless communication technology.

Figure 2:
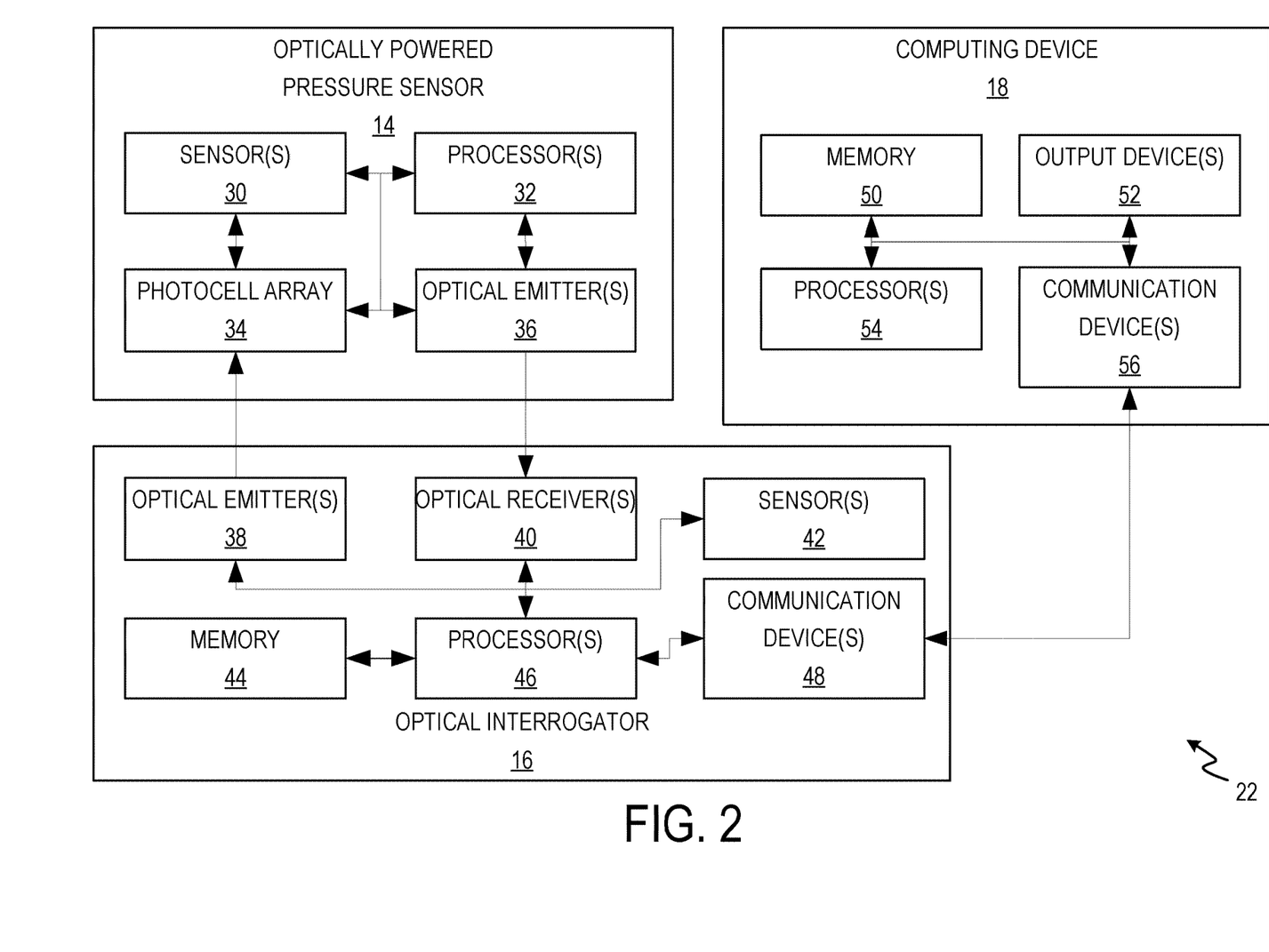
FIG. 2 is a block diagram of an optically powered remotely interrogated liquid gauging system.

FIG. 2 is a block diagram of optically powered remotely interrogated liquid gauging system 22. Optically powered remotely interrogated liquid gauging system 22 includes optically powered pressure sensor 14, optical interrogator 16, and computing device 18. Optically powered pressure sensor 14 includes sensor(s) 30, processor(s) 32, photocell array 34, and optical emitter(s) 36. Optical interrogator 16 includes optical emitter(s) 38, optical receiver(s) 40, sensor(s) 42, computer-readable memory 44, processor(s) 46, and one or more communications devices 48. Computing device 18 includes computer-readable memory 50, output device(s) 52, processor(s) 54, and communication device(s) 56.

Optically powered pressure sensor 14 is configured to receive light from and transmit data to optical interrogator 16. Photocell array 34 is configured to receive the light, generate electrical power from the light, and provide that power to sensor(s) 30, processor(s) 32, and optical emitter(s) 36. Sensor(s) 30 are configured to sense the at least one parameter of a liquid. In one example, sensor(s) 30 include a pressure sensor configured to sense a pressure and a temperature sensor configured to sense a temperature in response to receiving power from photocell array 34. Optical emitter(s) 36 transmit data to optical receiver(s) 40. In one example, optical emitter(s) 36 transmit the data using infrared light.

Processor(s) 32, in one example, are configured to implement functionality and/or process instructions for execution within optically powered pressure sensor 14. For instance, processor(s) 32 can be capable of processing instructions stored in memory of processor(s) 32. Examples of processor(s) 32 can include any one or more of a microprocessor, a controller, a digital signal processor (DSP), an application specific integrated circuit (ASIC), a field-programmable gate array (FPGA), or other equivalent discrete or integrated logic circuitry. In one example, processor(s) 32 are configured to receive data corresponding to the sensed one or more parameters and translate the data for transmission by optical emitter(s) 36.

Optical interrogator 16 is configured to provide light to and receive data from optically powered pressure sensor 14. Optical emitter(s) 38 are configured to provide light to photocell array 34. In one example, optical emitter(s) 38 are a white light emitting diode. Optical receiver(s) 40 are configured to receive data from optical emitter(s) 36 via optical signals. Sensor(s) 42 are configured to sense an ambient parameter. In one example, sensor(s) 42 are a pressure sensor configured to sense an ambient pressure. Processor(s) 46 are configured to receive the at least one parameter and the ambient parameter, and determine a quantity of the liquid from which the at least one parameter was sensed.

Processor(s) 46, in one example, are configured to implement functionality and/or process instructions for execution within optical interrogator 16. For instance, processor(s) 46 can be capable of processing instructions stored in computer-readable memory 44. Examples of processor(s) 46 can include any one or more of a microprocessor, a controller, a digital signal processor (DSP), an application specific integrated circuit (ASIC), a field-programmable gate array (FPGA), or other equivalent discrete or integrated logic circuitry. In one example, processor(s) 46 are configured to determine the quantity of the liquid using the data corresponding to the pressure and temperature of the liquid, the ambient pressure, and the geometry of the tank containing the liquid. In a further example, the liquid is fuel of an aircraft and the tank is a fuel tank of the aircraft.

Computer-readable memory 44 can be configured to store information within optical interrogator 16 during operation. Computer-readable memory 44, in some examples, is described as a computer-readable storage medium. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, computer-readable memory 44 is a temporary memory, meaning that a primary purpose of computer-readable memory 44 is not long-term storage. Computer-readable memory 44, in some examples, is described as a volatile memory, meaning that computer-readable memory 44 does not maintain stored contents when power to optical interrogator 16 is removed. Examples of volatile memories can include random access memories (RAM), dynamic random access memories (DRAM), static random access memories (SRAM), and other forms of volatile memories. In some examples, computer-readable memory 44 is used to store program instructions for execution by processor(s) 46. Computer-readable memory 44, in certain examples, is used by software applications running on optical interrogator 16 to temporarily store information during program execution, such as transmitting data using optical emitter(s) 38, receiving data using optical receiver(s) 40, sensing a parameter using sensor(s) 42, and/or transmitting and receiving data using communication device(s) 48.

Computer-readable memory 44, in some examples, also include one or more computer-readable storage media. Computer-readable memory 44 can be configured to store larger amounts of information than volatile memory. Computer-readable memory 44 can further be configured for long-term storage of information. In some examples, computer-readable memory 44 include non-volatile storage elements. Examples of non-volatile storage elements can include magnetic hard discs, optical discs, floppy discs, flash memories, or forms of electrically programmable memories (EPROM) or electrically erasable and programmable (EEPROM) memories. In one example, computer-readable memory 44 is configured to store data including the geometry of the tank holding the liquid.

Optical interrogator 16, as illustrated in FIG. 2, also includes communication device(s) 48. Optical interrogator 16, in one example, utilizes communication devices 48 to communicate with external devices via one or more wired or wireless networks, or both. Communication devices 48 can include a network interface card, such as an Ethernet card, an optical transceiver, a radio frequency transceiver, or any other type of device that can send and receive information. Other examples of such network interfaces can include Bluetooth, 3G, 4G, and WiFi radio computing devices, as well as Universal Serial Bus (USB). In one example, communication device(s) 48 are configured to transmit data to and receive data from computing device 18. Data transmitted by communication device(s) 48 includes the determined liquid quantity.

Computing device 18 can be a tablet, a smart phone, a fuel operations computer, a flight planning computer, the aircraft cockpit's electronic flight bag, etc. Computing device 18, as illustrated in FIG. 2, includes communication device(s) 56. Optical interrogator 16, in one example, utilizes communication device(s) 56 to communicate with external devices via one or more wired or wireless networks, or both. Communication device(s) 56 can include a network interface card, such as an Ethernet card, an optical transceiver, a radio frequency transceiver, or any other type of device that can send and receive information. Other examples of such network interfaces can include Bluetooth, 3G, 4G, and WiFi radio computing devices, as well as Universal Serial Bus (USB). In one example, communication device(s) 56 are configured to transmit data to and receive data from optical interrogator 16. Data received by communication device(s) 56 includes the determined liquid quantity.

Computing device 18, as illustrated in FIG. 2, also includes computer-readable memory 50. Computer-readable memory 50 can be configured to store information within computing device 18 during operation. Computer-readable memory 50, in some examples, is described as a computer-readable storage medium. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, computer-readable memory 50 is a temporary memory, meaning that a primary purpose of computer-readable memory 50 is not long-term storage. Computer-readable memory 50, in some examples, is described as a volatile memory, meaning that computer-readable memory 50 does not maintain stored contents when power to computing device 18 is removed. Examples of volatile memories can include random access memories (RAM), dynamic random access memories (DRAM), static random access memories (SRAM), and other forms of volatile memories. In some examples, computer-readable memory 50 is used to store program instructions for execution by processor(s) 54. Computer-readable memory 50, in certain examples, is used by software applications running on computing device 18 to temporarily store information during program execution, such as providing a graphical user interface using display 52 and/or transmitting and receiving data using communication device(s) 56.

Computer-readable memory 50, in some examples, also include one or more computer-readable storage media. Computer-readable memory 50 can be configured to store larger amounts of information than volatile memory. Computer-readable memory 50 can further be configured for long-term storage of information. In some examples, computer-readable memory 50 include non-volatile storage elements. Examples of non-volatile storage elements can include magnetic hard discs, optical discs, floppy discs, flash memories, or forms of electrically programmable memories (EPROM) or electrically erasable and programmable (EEPROM) memories. In one example, computer-readable memory 50 is configured to store data including the determined liquid quantity.

Computing device 18, as illustrated in FIG. 2, also includes processor(s) 54. Processor(s) 54, in one example, are configured to implement functionality and/or process instructions for execution within computing device 18. For instance, processor(s) 54 can be capable of processing instructions stored in computer-readable memory 50. Examples of processor(s) 54 can include any one or more of a microprocessor, a controller, a digital signal processor (DSP), an application specific integrated circuit (ASIC), a field-programmable gate array (FPGA), or other equivalent discrete or integrated logic circuitry. In one example, processor(s) 54 are configured to display the quantity of the liquid using output device(s) 52.

Output device(s) 52 can be configured to provide output to a user. Examples of output device(s) 52 can include, a display device, a sound card, a video graphics card, a speaker, a cathode ray tube (CRT) monitor, a liquid crystal display (LCD), or other type of device for outputting information in a form understandable to users or machines. In one example, output device(s) 52 is configured to display the determined liquid quantity. In one example, output device(s) 52 is a graphical user interface.

Figure 3A:
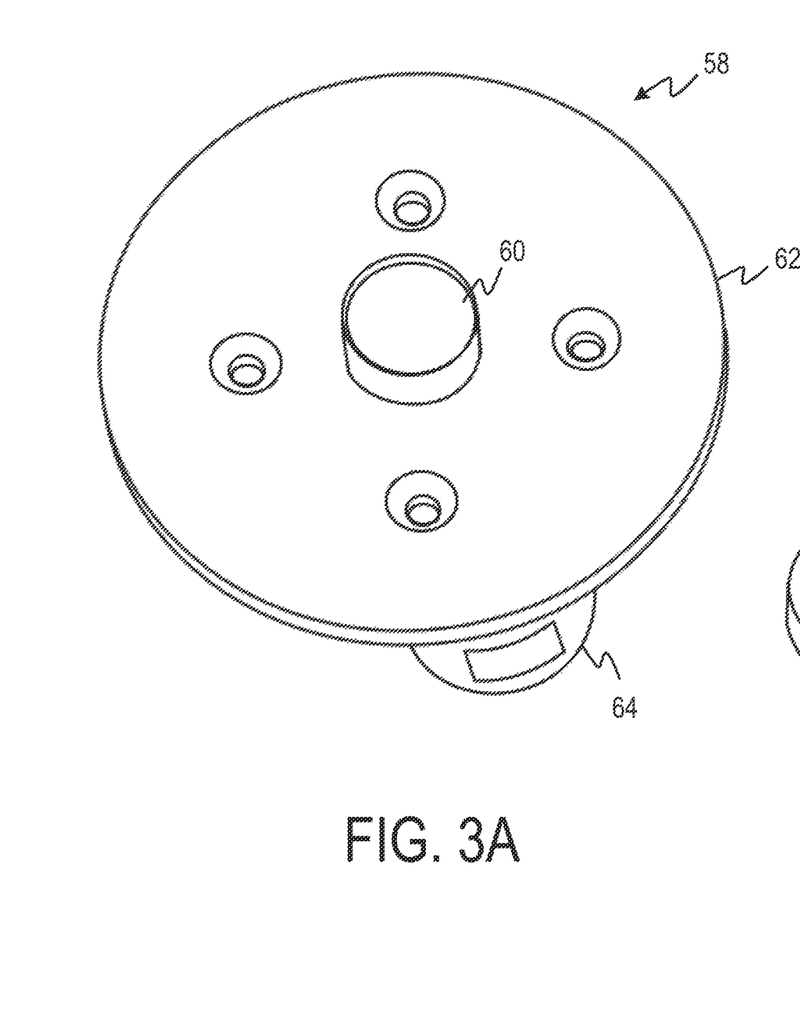
FIGS. 3A and 3B are perspective views of an optically powered pressure sensor housing.
Figure 3B:
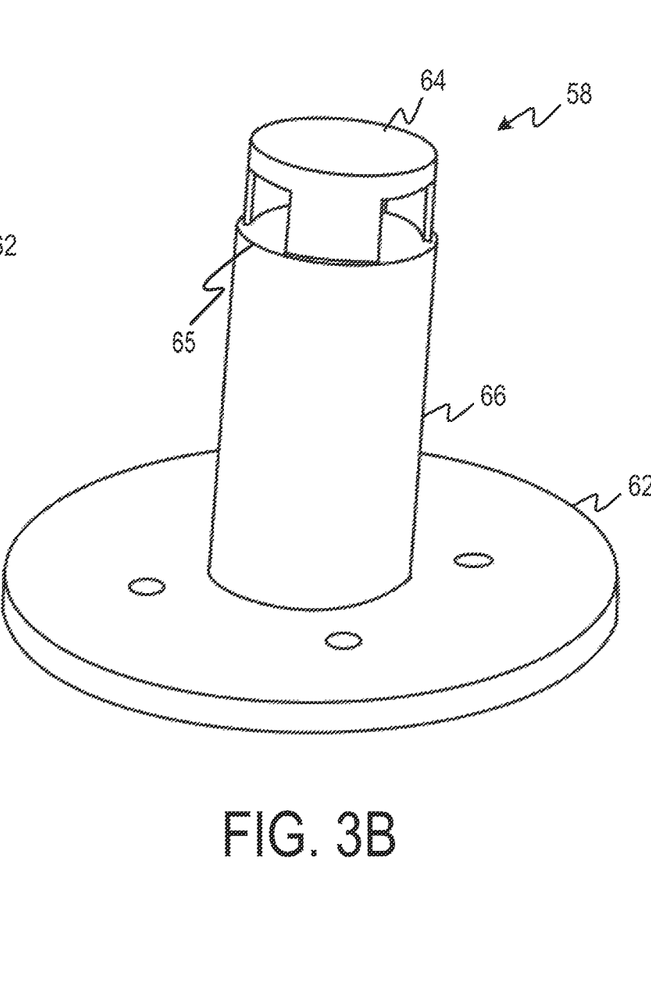

FIGS. 3A and 3B are perspective views of optically powered pressure sensor housing 58. Optically powered pressure sensor housing 58 includes photocell array window 60, attachment plate 62, top hat 64, diaphragm 65, and electronics housing 66.

Photocell array window 60 is located at a bottom portion of optically powered pressure sensor housing 58. Photocell array window 60 allows light to reach the photocell array while protecting the photocell array from external elements such as debris, moisture, and/or other hazards. Photocell array window 60 can be made of borosilicate glass, polycarbonate, silicone, or other optically transparent material. Attachment plate 62 includes holes for fasteners to attach optically powered pressure sensor housing 58 to the liquid tank to be monitored. Top hat 64 is configured to protect diaphragm 65 located at the top of electronics housing 66. Top hat 64 includes openings on the sides to allow liquid to contact diaphragm 65. Electronics housing 66 includes diaphragm 65. Diaphragm 65 forms at least a portion of the top surface of electronics housing 66.

Figure 4:
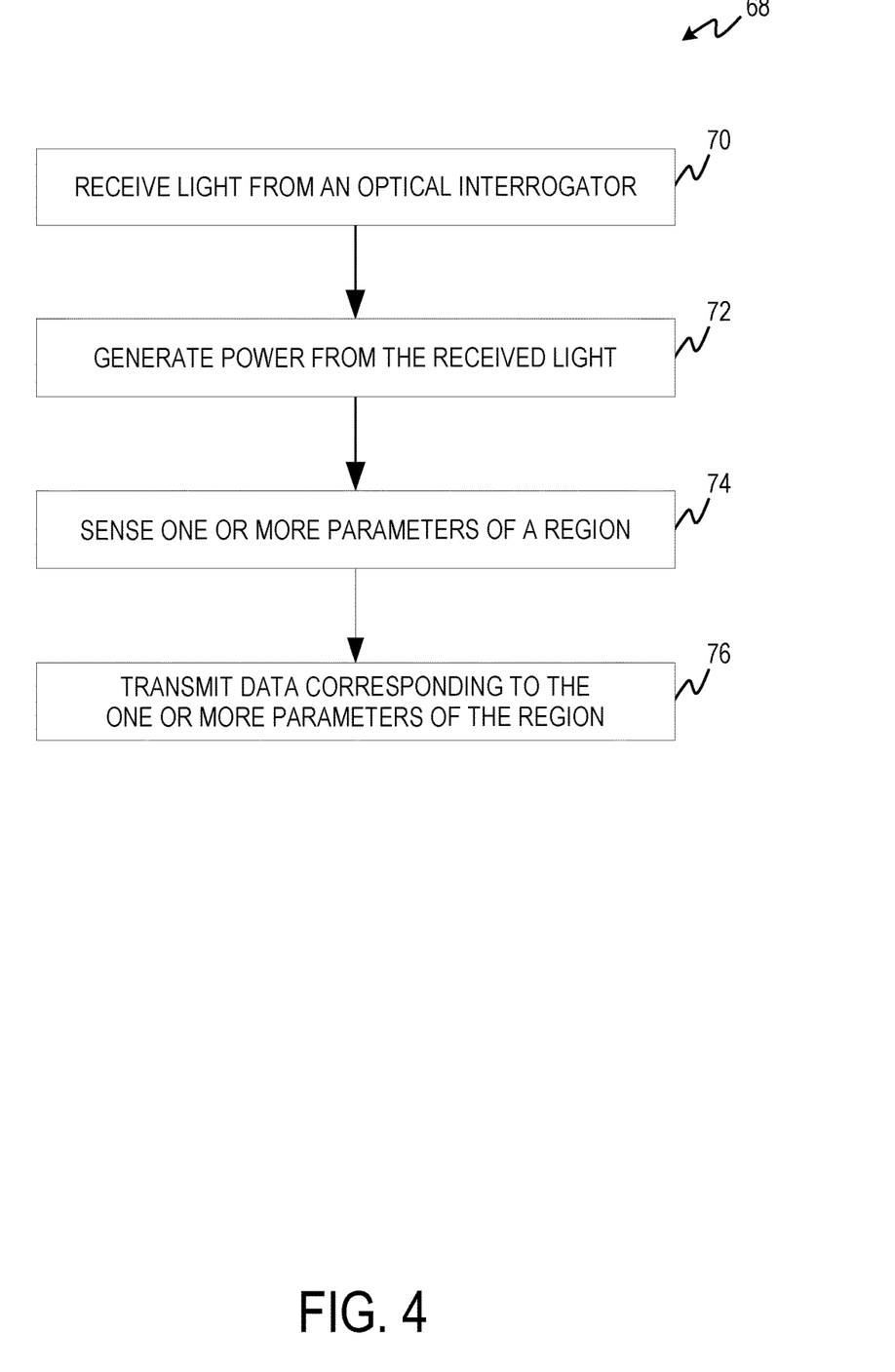
FIG. 4 is a flow diagram depicting a process for measuring a parameter of a region by an optically powered pressure sensor.

FIG. 4 is a flow diagram depicting process 68 for measuring a parameter of a region by an optically powered pressure sensor. For purposes of clarity and ease of discussion, the example operations are described below within the context of optically powered pressure sensor 14 of FIG. 2.

At step, 70 the light provided by the optical interrogator 16 is received by optically powered pressure sensor 14 via photocell array 34. The light from optical interrogator 16 can be directed by a user to photocell array 34. In one example, the light is in the visible spectrum so that the user can easily see and direct the light. At step 72, power is generated from the received light using photocell array 34. Power generated using photocell array 34 is provided to the various components of optically powered pressure sensor 14 including sensor(s) 30, processor(s) 32, and optical emitter(s) 36. At step 74, one or more parameters of a liquid are sensed using sensor(s) 30. The one or more parameters can be temperature and/or pressure. At step 76, data corresponding to the one or more parameters of the liquid are transmitted using optical emitter(s) 36. In one example, optical emitter(s) 36 uses infrared light.

Figure 5:
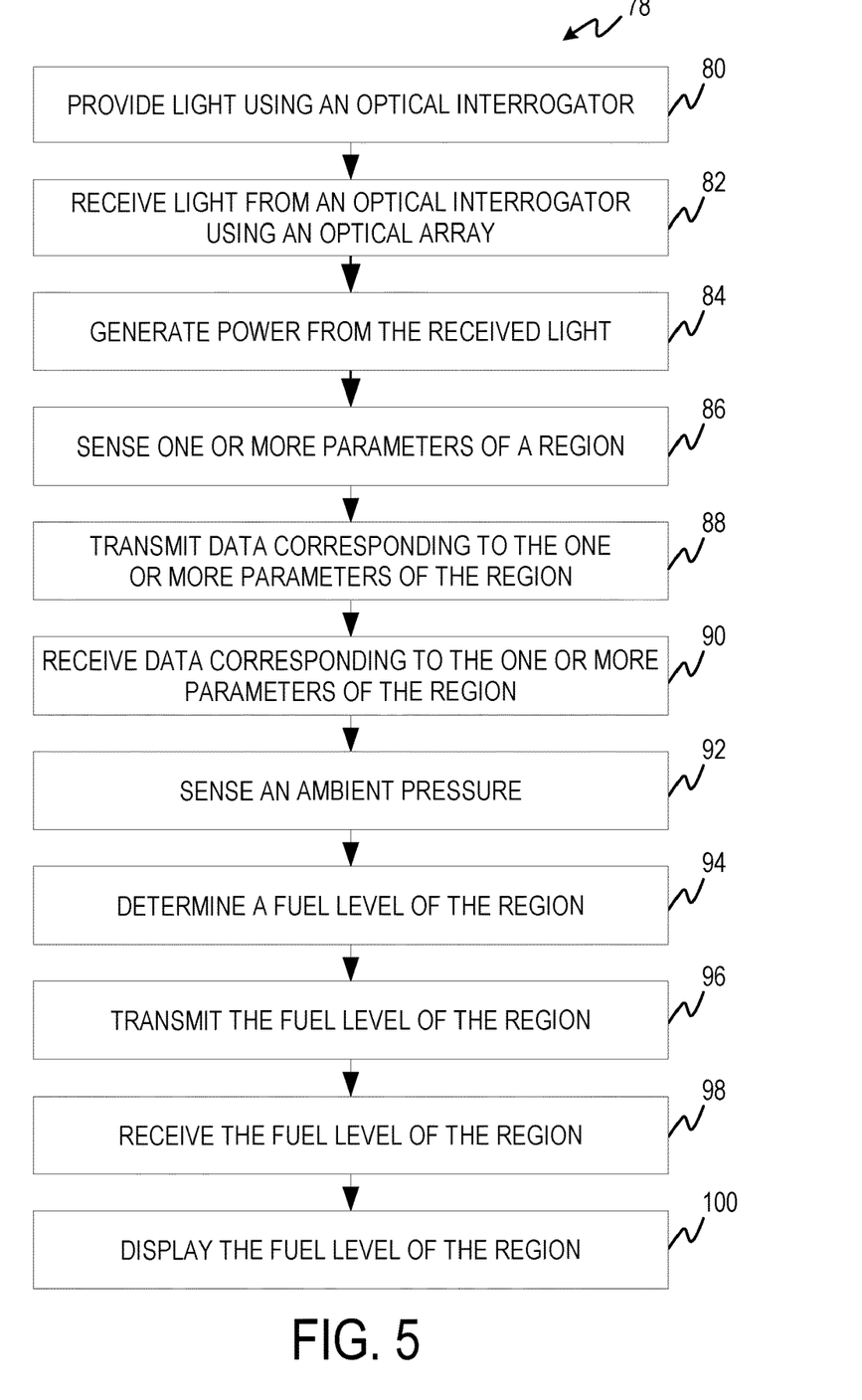
FIG. 5 is a flow diagram depicting a process for measuring a liquid quantity using an optically powered remotely interrogated liquid gauging system.

FIG. 5 is a flow diagram depicting process 78 for measuring a liquid quantity using an optically powered remotely interrogated liquid gauging system. For purposes of clarity and ease of discussion, the example operations are described below within the context of optically powered remotely interrogated liquid gauging system 22 of FIG. 2.

At step 80, light is provided using optical emitter(s) 38 of optical interrogator 16. In some examples, optical emitter(s) 38 is a white light emitting diode. Optical interrogator 16 can be operated by a user. At step, 82 the light provided by the optical interrogator 16 is received by optically powered pressure sensor 14 via photocell array 34. The light from optical interrogator 16 can be directed by a user to photocell array 34. In one example, the light is in the visible spectrum so that the user can easily see and direct the light. At step 84, power is generated from the received light using photocell array 34. Power generated using photocell array 34 is provided to the various components of optically powered pressure sensor 14 including sensor(s) 30, processor(s) 32, and optical emitter(s) 36. At step 86, one or more parameters of a liquid are sensed using sensor(s) 30. The one or more parameters can be temperature and/or pressure. At step 88, data corresponding to the one or more parameters of the liquid are transmitted using optical emitter(s) 36. In one example, optical emitter(s) 36 uses infrared light.

At step 90, data corresponding to the one or more parameters of the liquid is received by optical interrogator 16 using optical receiver(s) 40. At step 92, an ambient temperature is sensed using sensor(s) 42 of optical interrogator 16. At step 94, a quantity of the liquid is determined using processor(s) 46. In one example, the quantity of the liquid is determined using a pressure and temperature of the liquid, the ambient temperature, and the geometry of the liquid tank. At step 96, data corresponding to the determined quantity of the liquid is transmitted using communication device(s) 48. At step 98, the data corresponding to the determined quantity of the liquid is received by computing device 18 using communication device(s) 56. The computing device can be any of a tablet, a smartphone, a fuel operations computer, a flight planning computer, the aircraft cockpit's electronic flight bag, and/or other computer. At step 100, the fuel level of the region is displayed using output device(s) 52. In one example, output device(s) 52 is a graphical user interface.

Accordingly, implementing techniques of this disclosure, optically powered remotely interrogated liquid gauging system can determine a liquid quantity of a tank. Using the optically powered pressure sensor described herein, a pressure and temperature of a liquid can be sensed without exposing the liquid to electrical power. This allows fuel quantities to be measured without the risk of fire, or an explosion. Using the optical interrogator described herein allows a user to determine a fuel quantity of an aircraft without leaving the ground.

Discussion of Possible Embodiments

The following are non-exclusive descriptions of possible embodiments of the present invention.

An optically powered pressure sensor for sensing pressure of a liquid in a tank can comprise a hermetically sealed housing with at least a portion of the housing having a diaphragm, the hermetically sealed housing can form at least a portion of a hermetically sealed wall of the tank; at least one sensor within the hermetically sealed housing can be configured to sense the pressure of the liquid; at least one optical emitter can be configured to transmit data corresponding to the sensed pressure; and a photocell array can be configured to receive light and provide power to the at least one sensor and the at least one optical emitter.

The optically powered pressure sensor of the preceding paragraph can optionally include, additionally and/or alternatively, any one or more of the following features, configurations and/or additional components:

The at least one optical emitter can be a light emitting diode configured to transmit data using infrared light.

The optically powered pressure sensor can further comprise at least one temperature sensor can be configured to sense a temperature of the liquid; and wherein the at least one optical emitter can be further configured to transmit data corresponding to the sensed temperature.

The liquid can be fuel of a fuel tank of an aircraft.

The hermetically housing can be electrically coupled to a wing skin of the aircraft.

The hermetically sealed housing can be stainless steel.

A system can comprise an optically powered pressure sensor for sensing pressure of a liquid in a tank can comprise a hermetically sealed housing with at least a portion of the housing having a diaphragm, the hermetically sealed housing can form at least a portion of a hermetically sealed wall of the tank; at least one sensor within the hermetically sealed housing can be configured to sense the pressure of the liquid; at least one optical emitter can be configured to transmit data corresponding to the sensed pressure of the liquid; and a photocell array can be configured to receive light and provide power to the at least one sensor and the at least one optical emitter; and an optical interrogator can be configured to provide high power light to the photocell array and receive data from the at least one optical emitter.

The system of the preceding paragraph can optionally include, additionally and/or alternatively, any one or more of the following features, configurations and/or additional components:

The optical interrogator can comprise one or more optical emitters can be configured to provide the high power light; at least one optical receiver can be configured to receive the data corresponding to the sensed pressure of the liquid from the optical emitter; and at least one pressure sensor can be configured to sense an ambient pressure.

The optically powered pressure sensor can further comprise at least one temperature sensor to measure a temperature of the liquid; and wherein the at least one optical emitter can be further configured to transmit data corresponding to the sensed temperature.

The optical interrogator can further comprise a memory can be configured to store a geometry of a tank holding the liquid; and a processor can be configured to determine a fuel quantity of the liquid using the data corresponding to the sensed temperature of the liquid, the data corresponding to the sensed pressure of the liquid, data corresponding to the sensed ambient temperature, and the geometry of the tank holding the liquid.

A computing device can be communicatively coupled to the optical interrogator, wherein the computing device can be configured to receive data corresponding to the determined fuel quantity from the optical interrogator.

The computing device can be configured to display, using a graphical user interface, the fuel quantity to a user.

The computing device can be a tablet.

The one or more emitters can be one or more white light emitting diodes.

The one or more emitters can be one or more white light emitting diodes.

A method can comprise receiving light from an optical interrogator via a photocell array; generating, in response to receiving the light, power from the received light using the photocell array; sensing, in response to generating the power, a pressure of a liquid using at least one sensor, the at least one sensor powered by the photocell array; and transmitting, in response to measuring the pressure, data corresponding to the pressure of the liquid using at least one optical emitter.

The method of the preceding paragraph can optionally include, additionally and/or alternatively, any one or more of the following features, configurations and/or additional components:

The at least one optical emitter can be a light emitting diode configured to transmit data using infrared light.

The method can further include sensing, in response to generating the power, a temperature of the liquid using at least one temperature sensor; and transmitting, in response to sensing the temperature, data corresponding to the sensed temperature of the liquid using the at least one optical emitter.

The liquid can be fuel of a fuel tank of an aircraft.

The hermetically housing can be electrically coupled to a wing skin of the aircraft.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An optically powered pressure sensor for sensing pressure of a liquid in a tank comprising:
   a hermetically sealed housing with at least a portion of the housing having a diaphragm, the hermetically sealed housing forms at least a portion of a hermetically sealed wall of the tank;
   at least one sensor within the hermetically sealed housing configured to sense the pressure of the liquid;
   at least one optical emitter configured to transmit data corresponding to the sensed pressure; and
   a photocell array configured to receive light and provide power to the at least one sensor and the at least one optical emitter.

2. The optically powered pressure sensor of claim 1, wherein the at least one optical emitter is a light emitting diode configured to transmit data using infrared light.

3. The optically powered pressure sensor of claim 1, further comprising:
   at least one temperature sensor configured to sense a temperature of the liquid; and
   wherein the at least one optical emitter is further configured to transmit data corresponding to the sensed temperature.

4. The optically powered pressure sensor of claim 1, wherein the liquid is fuel of a fuel tank of an aircraft.

5. The optically powered pressure sensor of claim 4, wherein the hermetically housing is electrically coupled to a wing skin of the aircraft.

6. The optically powered pressure sensor of claim 4, wherein the hermetically sealed housing is stainless steel.

7. A system comprising:
   an optically powered pressure sensor for sensing pressure of a liquid in a tank comprising:
      a hermetically sealed housing with at least a portion of the housing having a diaphragm, the hermetically sealed housing forms at least a portion of a hermetically sealed wall of the tank;
      at least one sensor within the hermetically sealed housing configured to sense the pressure of the liquid;
      at least one optical emitter configured to transmit data corresponding to the sensed pressure of the liquid; and
      a photocell array configured to receive light and provide power to the at least one sensor and the at least one optical emitter; and
   an optical interrogator configured to provide high power light to the photocell array and receive data from the at least one optical emitter.

8. The system of claim 7, wherein the optical interrogator comprises:
   one or more optical emitters configured to provide the high power light;
   at least one optical receiver configured to receive the data corresponding to the sensed pressure of the liquid from the optical emitter; and
   at least one pressure sensor configured to sense an ambient pressure.

9. The system of claim 8, wherein the optically powered pressure sensor further comprises at least one temperature sensor to measure a temperature of the liquid; and
   wherein the at least one optical emitter is further configured to transmit data corresponding to the sensed temperature.

10. The system of claim 9, wherein the optical interrogator further comprises:
    a memory configured to store a geometry of a tank holding the liquid; and
    a processor configured to determine a fuel quantity of the liquid using the data corresponding to the sensed temperature of the liquid, the data corresponding to the sensed pressure of the liquid, data corresponding to the sensed ambient temperature, and the geometry of the tank holding the liquid.

11. The system of claim 10, further comprising a computing device communicatively coupled to the optical interrogator, wherein the computing device is configured to receive data corresponding to the determined fuel quantity from the optical interrogator.

12. The system of claim 11, wherein the computing device is configured to display, using a graphical user interface, the fuel quantity to a user.

13. The system of claim 11, wherein the computing device is a tablet.

14. The system of claim 8, wherein the one or more emitters is one or more white light emitting diodes.

15. A method comprising:
    receiving light from an optical interrogator via a photocell array;
    generating, in response to receiving the light, power from the received light using the photocell array;
    sensing, in response to generating the power, a pressure of a liquid using at least one sensor, the at least one sensor powered by the photocell array; and transmitting, in response to measuring the pressure, data corresponding to the pressure of the liquid using at least one optical emitter.

16. The method of claim 15, wherein the at least one optical emitter is a light emitting diode configured to transmit data using infrared light.

17. The method of claim 15, further comprising:
sensing, in response to generating the power, a temperature of the liquid using at least one temperature sensor; and
transmitting, in response to sensing the temperature, data corresponding to the sensed temperature of the liquid using the at least one optical emitter.

18. The method of claim 15, wherein the liquid is fuel of a fuel tank of an aircraft.

19. The method of claim 18, wherein the hermetically housing is electrically coupled to a wing skin of the aircraft.

* * * * *